(12) United States Patent
Mortensen Ernits et al.

(10) Patent No.: US 11,794,903 B2
(45) Date of Patent: Oct. 24, 2023

(54) SYSTEM FOR PROVIDING TEMPERATURE-CONTROLLED WATER IN AN AIRCRAFT

(71) Applicant: Airbus Operations GmbH, Hamburg (DE)

(72) Inventors: Rafael Mortensen Ernits, Hamburg (DE); Oliver Kiehne, Hamburg (DE); Matthias Reiss, Hamburg (DE); Oliver Delaplanche, Hamburg (DE); Markus Tiemann, Hamburg (DE); Dennis Keiser, Hamburg (DE)

(73) Assignee: Airbus Operations GmbH

( * ) Notice: Subject to any disclaimer, the term of this patent is extended or adjusted under 35 U.S.C. 154(b) by 6 days.

(21) Appl. No.: 17/482,586

(22) Filed: Sep. 23, 2021

(65) Prior Publication Data

US 2022/0089284 A1   Mar. 24, 2022

(30) Foreign Application Priority Data

Sep. 24, 2020   (DE) .......................... 102020124879.2

(51) Int. Cl.
  *B64D 11/04*   (2006.01)
  *B64D 11/00*   (2006.01)
  (Continued)

(52) U.S. Cl.
  CPC .......... *B64D 11/04* (2013.01); *B64D 11/0007* (2013.01); *F24H 9/2021* (2013.01); *F24H 15/223* (2022.01); *F24H 1/009* (2013.01)

(58) Field of Classification Search
  CPC .......................... B64D 11/04; B64D 11/0007
  See application file for complete search history.

(56) References Cited

U.S. PATENT DOCUMENTS 8,720,463 B2 *   5/2014   Becker ................... B64D 11/02
                                                4/596
2010/0237021 A1 *  9/2010   Guttau ................... B01D 61/18
                                                210/791
(Continued)

FOREIGN PATENT DOCUMENTS

DE   102009021970 A1   11/2010
DE   102010014392 A1   10/2011
(Continued)

OTHER PUBLICATIONS

German Search Report for Application No. 102020124879.2 dated Sep. 24, 2020, pp. 1-8 (p. 2 categorizing cited references).
(Continued)

*Primary Examiner* — Joshua J Michener
*Assistant Examiner* — Cindi M Curry
(74) *Attorney, Agent, or Firm* — Lerner David LLP

(57) ABSTRACT

A system for providing temperature-controlled water in an aircraft has a tank, a water temperature-controlling unit, a control unit, and a power supply terminal. The water temperature-controlling unit can be coupled to the tank to heat or to cool water situated therein. The control unit is connected to the water temperature-controlling unit to activate the water temperature-controlling unit for controlling the temperature of water in the tank to a predefined temperature. The power supply terminal can be connected to an on-board voltage source for the water temperature-controlling unit and the control unit to be supplied with electrical voltage. The system is in the form of a coherent and self-contained unit which can be integrated into a standard parking place of a galley of the aircraft. The tank is mounted so as to be exchangeable or the system has a water discharge connection which is coupled to the tank.

12 Claims, 2 Drawing Sheets

(51) Int. Cl.
    *F24H 9/20*     (2022.01)
    *F24H 15/223*     (2022.01)
    *F24H 1/00*     (2022.01)

(56) References Cited

U.S. PATENT DOCUMENTS

| | | |
|---|---|---|
| 2012/0056036 A1 | 3/2012 | Lindauer et al. |
| 2013/0094994 A1 | 4/2013 | Risch et al. |
| 2014/0059796 A1* | 3/2014 | Boodaghians ......... B64D 11/00 |
| | | 250/455.11 |
| 2015/0266580 A1 | 9/2015 | Lee et al. |
| 2017/0341602 A1* | 11/2017 | Seibt ..................... A47K 1/04 |
| 2021/0361799 A1* | 11/2021 | Gonzalez ................. A61L 2/24 |

FOREIGN PATENT DOCUMENTS

| | | | |
|---|---|---|---|
| DE | 102010018273 A1 | 10/2011 | |
| EP | 2868243 A1 * | 5/2015 | ............ A47J 31/005 |
| EP | 2868243 A1 | 5/2015 | |
| GB | 2497264 A * | 6/2013 | ................ C02F 9/00 |
| WO | WO-2016096440 A1 * | 6/2016 | ............ A47J 31/005 |
| WO | WO-2022020161 A1 * | 1/2022 | |

OTHER PUBLICATIONS

Extended European Search Report for EP Application No. 21198720 dated Jan. 26, 2022, 2 pgs.

* cited by examiner

SYSTEM FOR PROVIDING TEMPERATURE-CONTROLLED WATER IN AN AIRCRAFT

TECHNICAL FIELD

The invention relates to a system for providing temperature-controlled water in an aircraft, to a galley, and to an aircraft having a galley and/or having such a system.

BACKGROUND OF THE INVENTION

The provision of temperature-controlled water on board an aircraft normally comprises the cooling of bottled beverages or the heating of water by means of a water-heating apparatus which is provided separately for this purpose. Also known are trolleys with an integrated water discharge apparatus, which are normally provided with insulated water tanks which are filled with cold or hot water outside the aircraft. This is fairly cumbersome, however, and the temperature of the stored water cannot be maintained indefinitely. An integrated water-heating apparatus would increase the weight of the trolley and also require a high level of electrical power.

SUMMARY OF THE INVENTION

It is consequently an object of the invention to propose a maximally convenient device by way of which a trolley with an integrated water discharge apparatus can provide a sufficient amount of temperature-controlled water for the preparation of beverages.

The object is achieved by a system for providing temperature-controlled water in a utility vehicle having the features of independent claim 1. Advantageous embodiments and refinements emerge from the dependent claims and from the following description.

What is proposed is a system for providing temperature-controlled water in an aircraft that has at least one tank, has at least one water temperature-controlling unit, has a control unit, and has a power supply terminal, wherein the at least one water temperature-controlling unit can be coupled to the at least one tank in order to heat or to cool water situated therein, wherein the control unit is connected to the at least one water temperature-controlling unit in order to activate the at least one water temperature-controlling unit for controlling the temperature of water in the at least one tank to a predefined temperature, wherein the power supply terminal can be connected to an on-board voltage source in order for the at least one water temperature-controlling unit and the control unit to be supplied with electrical voltage, wherein the system is in the form of a coherent and self-contained unit which can be integrated into a standard parking place of a galley of the aircraft, and wherein the at least one tank is mounted so as to be exchangeable or the system has a water discharge connection which is coupled to the at least one tank.

The at least one tank is a water tank. It is configured for receiving and storing a predefined volume of water. Preferably, the at least one tank is formed from a material which leads to a particularly low weight of the tank. Besides a fibre-reinforced plastic, for example GFRP or CFRP, an aluminium alloy could also be considered. The at least one tank could be provided on an inner side with a coating which is suitable for permanent contact with drinking water.

The at least one tank could have thermal insulation. If the at least one tank is mounted so as to be exchangeable, quick-action fasteners and/or other locking devices could be provided to securely mount the at least one tank in the system. Here, the at least one tank should be configured in such a way that a user, in particular a cabin crew member, can take the at least one tank out of the system and readily insert it into a trolley. Here, the maximum weight for a filled tank should not exceed a particular limit. This could be determined principally by the filling volume of the tank, which for example lies in a range of 5 to 20 l. The realizable size is dependent on the structural space offered, this being determined however by the structural shape of the parking place for the system. Moreover, here, a surface temperature of the at least one tank should, for example, not be above body temperature, or have correspondingly insulated grips which have a lower temperature level.

If the at least one tank is mounted so as to be exchangeable, it is expedient to arrange said tank in a guide which simplifies the movement of the filled tank from the system into a trolley, or the like, to be filled thereby. For example, the receiving heights of the at least one tank both in the system and in the trolley can be matched to one another so that a filled tank can be displaced at the same level from the system into the trolley. An emptied tank possibly still present in the trolley could be manually lifted or pulled out of the trolley owing to the significantly lower weight.

The at least one water temperature-controlling unit is an apparatus which is configured for actively influencing a water temperature by way of heating or cooling. The at least one water temperature-controlling unit could consequently have a cooling unit or a heating unit. If a plurality of tanks are provided in the system, it could be advantageous for example to couple one tank to a heating unit and another tank to a cooling unit. The system could then provide both cooled water and heated water.

The control unit ensures the temperature control of the water in that the at least one water temperature-controlling unit is activated by the control unit. The control unit could have information about a predefined temperature which water in the at least one tank is intended to have. A target temperature could be fixedly preset, or be settable by way of an operator control interface. Through corresponding monitoring of a temperature, the control unit is capable of establishing a deviation of the water temperature from a predefined temperature. If the deviation exceeds a particular tolerable amount, the control unit could activate the heating unit and/or cooling unit. The thermal power provided by the heating unit and/or cooling unit could be variable and be demanded according to the deviation. Alternatively, the power could also be fixed and the control unit merely switches the corresponding water temperature-controlling unit on or off.

The power supply terminal could be realized in various ways. Firstly, provision could be made of a corresponding socket which can be connected to a connection line. This could be a screwable plug, for example. Equally, the power supply terminal itself could have a preferably screwable plug which can be screwed into a corresponding socket. The system could have a housing or a frame, with a plug-in connector being integrated as a fixed constituent part therein. In the parking place into which the system is to be installed, there may be arranged a plug-in connector which is shaped in a complementary manner. If the system is introduced fully into the parking place and fixed there, the plug-in connectors are connected to one another. Moreover, an inductive coupling via coils which can be brought into alignment could be considered, wherein one of the coils is arranged on a wall of the system and the other coil is arranged on a wall of a corresponding parking place. If required, the system could comprise a power converter which is configured for matching the operating voltage for the control unit and/or the water temperature-controlling unit.

Since the system forms a coherent, self-contained unit, the integration of the system into the galley is sufficient for supply of cooled and/or heated water within a cabin of the aircraft for example to trolleys with an integrated water discharge apparatus. As mentioned previously, the supply could be realized through removal of the tank and introduction into a corresponding trolley, or through the use of a water discharge connection and corresponding coupling to the respective trolley.

In an advantageous embodiment, the system furthermore has a water feed connection which is coupled to the at least one tank in order to supply the at least one tank with water from an on-board water tank. The on-board water tank could be a fresh-water tank on board the aircraft. In this way, fresh water can, according to requirement, be guided from an on-board fresh-water system into the at least one tank. If such a fresh-water tank is not coupled to a pump or some other pressure-increasing device, a corresponding pump could be arranged upstream of the water feed connection. It is conceivable for the control unit to be configured for automatic replenishment of the at least one tank with water from the on-board water tank if a minimum fill level is fallen below. It could also be expedient, however, for the purpose of saving water, to dispense with such a function and to realize only a display unit which indicates a low water fill level. A user could then initiate replenishment by activating a replenishment button or the like.

Here, a filter unit is preferably arranged between the water feed connection and the at least one tank. The filter unit may have a single-stage filter or multi-stage filter. In particular, particulate contaminants can thus be filtered out. For the purpose of ensuring a correct taste and aroma, it would moreover be possible for an activated carbon filter to be provided.

Furthermore, the system could have a sensor which is connected to the control unit and which serves for detecting a water temperature in the at least one tank. It is thus made possible for the control unit to set a predefined water temperature in the respective tank. It goes without saying that, with the use of a plurality of tanks, there is provided in each case one sensor which measures the water temperature in the respective tank, so that the control unit performs control on the basis thereof.

In an advantageous refinement, the at least one water temperature-controlling unit has a heat exchanger through which water from the at least one tank can flow and which is coupled to a heating or cooling device in order for the water flowing through to be heated or to be cooled. The heating or cooling device could accordingly be arranged outside the at least one tank. In this way, the design of the at least one tank is significantly simplified. Removal of the tank would also be simplified in this case.

Preferably, the heat exchanger has a first connection, which is connected fluidically to the respective tank, and a second connection, which is connected fluidically to the respective tank, such that water, after flowing through the heat exchanger, is guided back into the respective tank. Instead of a simple nm-through, a circulation for which relatively low heating or cooling power is required to achieve corresponding temperature control is consequently carried out.

Furthermore, the system could have at least one germ-reducing unit which can be coupled to the at least one tank and which is configured for reducing the germ count of water in the at least one tank. In this way, a high quality of drinking water can be ensured. Various germ-reducing units with physical or chemical action are considered in this case.

The germ-reducing unit could furthermore have a UV lamp which is arranged in the at least one tank. The UV lamp emits, for example directly within the at least one tank, high-intensity ultraviolet light, which leads to the killing of germs.

One advantageous embodiment furthermore has an outlet connection for selective removal of water. The removal of water may comprise the removal of water from the at least one tank and/or an external unit which is supplied with temperature-controlled water by the system according to the invention. This makes possible simple emptying of the system, or of the external unit connected thereto, for counteracting the formation of germs or of an accumulation of contaminants and moreover for bringing about protection against icing.

The system according to the invention may furthermore have a water-receiving connection which is configured for receiving water from a unit provided with a supply by the system and for feeding said water to the outlet connection. The water-receiving connection could be provided parallel to the water discharge connection. Besides gravity-induced removal of water from the external unit, a pump could also be provided for this purpose.

Preferably, the system has a water discharge connection which is arranged at a flexible water line for connection to a connection provided outside the system. The system could thus have a tube, or a similar device, which can be connected to an external unit in order to supply the latter with temperature-controlled water from the at least one tank. Furthermore, the flexible water line could also be retractable, for example by way of a winding mechanism or retraction mechanism.

Furthermore, the system could be configured for being arranged in a half-size or full-size trolley parking place of a galley and is accordingly designed so as to be complementary thereto. The system could have a frame or a housing which can be integrated, in particular in a flush manner, into such a parking place so that the system is configured as an integral constituent part of the galley.

The invention furthermore relates to a galley for an aircraft, having at least one parking place, in particular a trolley parking place, and having at least one system according to the above description integrated therein.

The invention moreover relates to an aircraft having at least one galley of said type and/or having at least one system according to the above description arranged therein.

In an advantageous embodiment, the aircraft furthermore has a trolley which can be provided with a supply by the system and which has a device for receiving and discharging temperature-controlled water.

BRIEF DESCRIPTION OF THE FIGURES

Further features, advantages and possible uses of the present invention emerge from the following description of the exemplary embodiments and from the figures. Here, all of the features described and/or illustrated in the figures form the subject matter of the invention individually and in any desired combination, even independently of the combination of said features in the individual claims or the back-references thereof. Furthermore, in the figures, the same reference signs are used for identical or similar objects.

DETAILED ILLUSTRATION OF EXEMPLARY EMBODIMENTS

Figure 1:
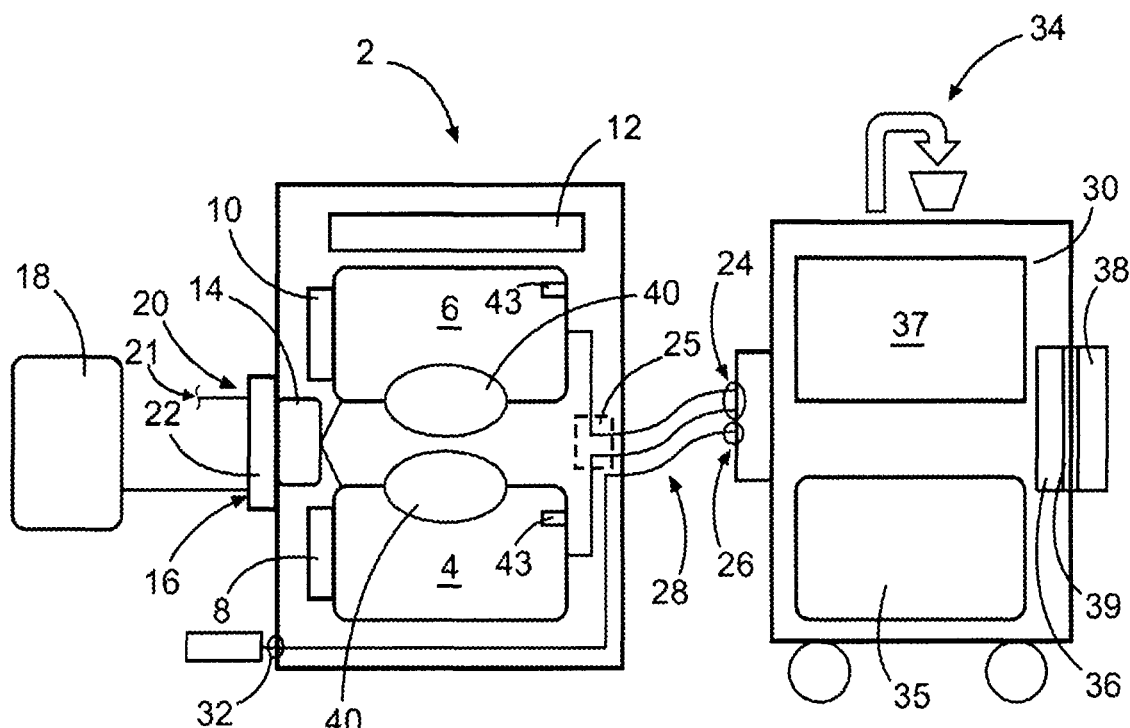
FIG. 1 shows a first exemplary embodiment of a system according to the invention.

FIG. 1 shows a first exemplary embodiment of a system 2 for providing temperature-controlled water in an aircraft. By way of example, the system 2 has a first tank 4 and a second tank 6 in a housing or frame 100. A cooling unit 8 is arranged as a water temperature-controlling unit on the first tank 4. Analogously, a heating unit 10 is arranged as a water temperature-controlling unit on the second tank 6. The two water temperature-controlling units 8 and 10 are connected to a control unit 12. The control unit 12 is configured for activating the water temperature-controlling units 8 and 10 so that they cool water in the first tank 4 or heat water in the second tank 6. For this purpose, both tanks 4 and 6 may have in each case one sensor 43 which is coupled to the control unit 12 and is configured for transmitting a water temperature in the tanks 4 and 6 to the control unit 12 for control. Both tanks 4 and 6 are connected via a filter unit 14 to a water feed connection 16, which is coupled to an on-board water tank 18 situated in the respective aircraft. Additionally, a power supply terminal 20 for connection to an on-board voltage source 21 is provided. This, together with the water feed connection 16, would allow an interface 22 to be formed.

Here, by way of example, the system 2 has a water discharge connection 24, which is provided together with a water-receiving connection 26 at a flexible tube-like line 28. Consequently, the system 2 can be connected to a trolley 30 in order for water to be discharged from the first tank 4 and/or from the second tank 6 or in order for water to be received from the trolley 30 and guided to an outlet connection 32. The system 2 may have a pump 25 by which the trolley 30 can be supplied with water. In this way, it is not necessary, for delivering water to the trolley 30, to permit the inflow of fresh water via the water feed connection 16.

The trolley 30 has a water discharge apparatus 34 which is configured for discharging water from a trolley tank 35. The trolley tank 35 could, for example, store cold or warm water and be used for the preparation of beverages by means of the discharge apparatus 34. Merely by way of example, a battery 36 which supplies an integrated pump 37 with electrical voltage is provided here. The pump 37 is intended for delivering water to the discharge apparatus 34 from the trolley tank 35. The battery 36 can be recharged via an inductive charging apparatus. For this purpose, the battery 36 is equipped with a first coil unit 39 which can be brought into alignment with a second coil unit 38 to enable transmission of electrical power from the second coil unit 38 into the first coil unit 39. Here, the second coil unit 38 is arranged in a trolley parking place such that, when the trolley 30 is parked, a supply of energy to the trolley 30 is realized directly. The first coil unit 39 may additionally have an electronics unit (not shown), which controls the charging process of the battery 36.

For the purpose of reducing the germ count, both tanks 4 and 6 are in each case equipped with a germ-reducing unit 40, which is for example in the form of a UV lamp.

Figure 2:
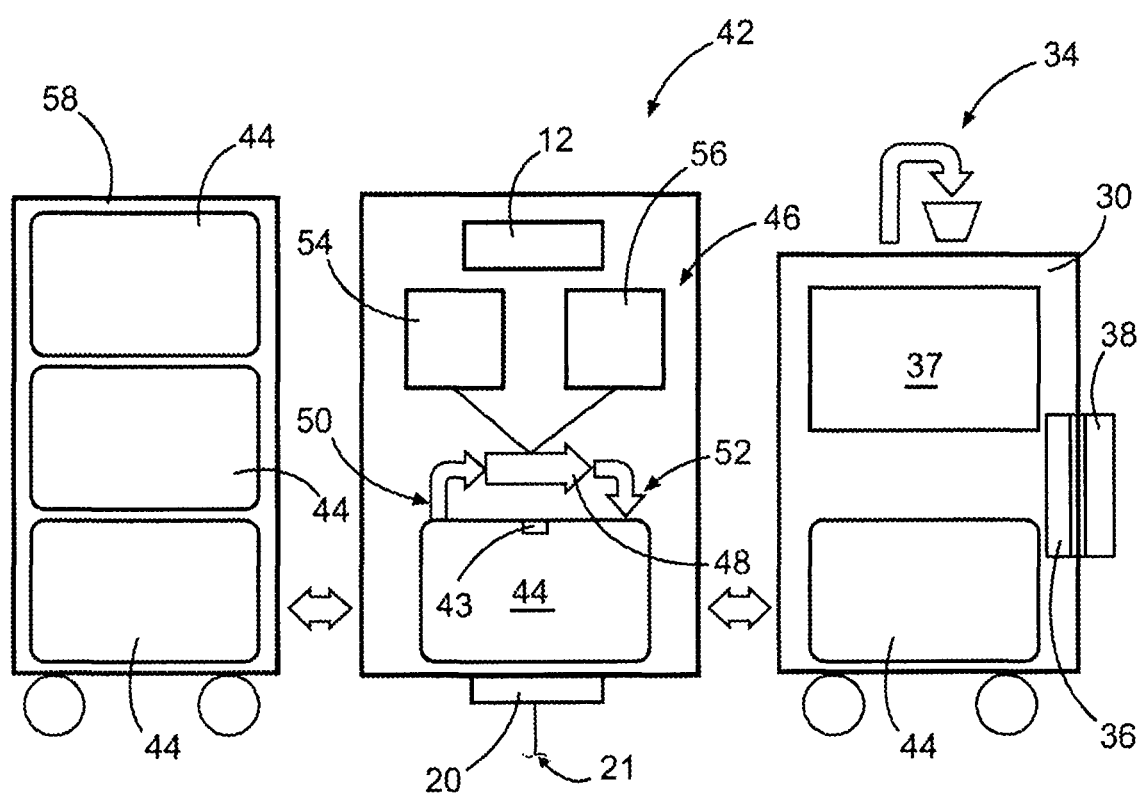
FIG. 2 shows a second exemplary embodiment of a system according to the invention.

FIG. 2 shows an alternative system 42, in which, by way of example, only a single tank 44 is provided in a housing or frame 400. It goes without saying, however, that a plurality of tanks 44 is possible. A water temperature-controlling unit 46 which is coupled via a heat exchanger 48 to the interior of the tank 44 is provided. For this purpose, the heat exchanger 48 has a first connection 50 and a second connection 52 that are connected fluidically to the tank 44. The water temperature-controlling unit 46 has, for cooling or heating, according to choice, a cooling unit 54 and a heating unit 56, which are also connected to the control unit 12. The use of the heat exchanger 48 makes it possible for water to be circulated, so as to continuously allow cooling or heating of the water in the tank 44. The tank 44 may likewise have a sensor 43 which is coupled to the control unit 12 in order to transmit the present water temperature in the tank 44 to the control unit 12 for control. The power supply terminal 20 is, by way of example, provided on a bottom side of the system 42.

The replenishment of water is realized here via the exchange of the tank 44, wherein, for example, provision could be made of a further trolley 58 in which a plurality of filled tanks 44 are provided. The filling of the trolley 30 is however likewise realized via insertion of the tank 44.

Figure 3:
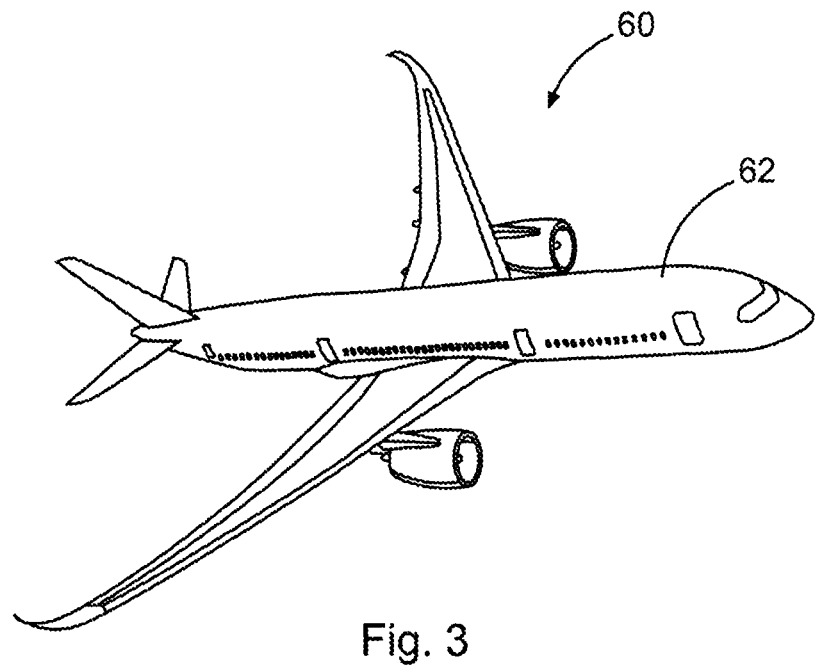
FIG. 3 shows an aircraft in which such a system is integrated into a galley.

Finally, FIG. 3 shows an aircraft 60 in which there is provided a cabin 62 with a galley in which at least one system 2 and/or 42 as presented above is provided.

Figure 4:
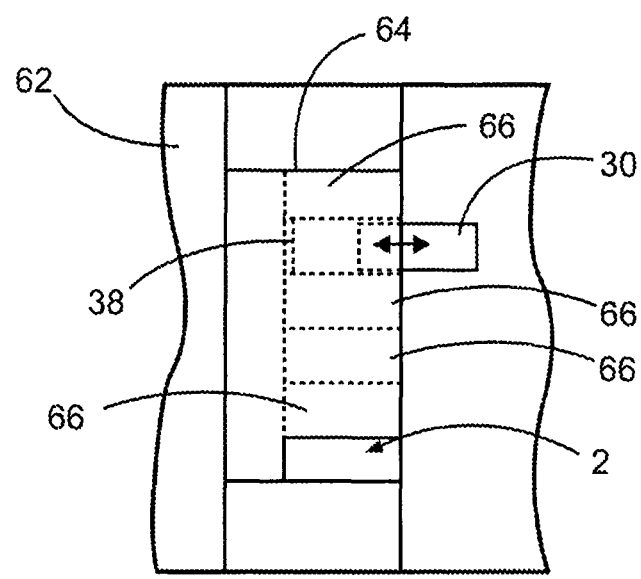
FIG. 4 schematically shows a galley with a system installed therein.

FIG. 4 shows a detail from the cabin 62. Here, a galley 64 can be seen in a plan view. The galley 64 has a plurality of parking places 66 which serve for receiving a trolley. By way of example, the trolley 30 from the preceding illustrations is shown at a parking place 66. Another parking place 66 is provided with the system 2, which, in terms of its size, is matched to the parking place 66. This applies analogously to the use of the system 42 in the parking place 66. All the connections intended for the operation of the system 2 or 42 and an on-board water tank 18 required for the system 2 are provided in the galley 64 or in the aircraft 60.

It is additionally pointed out that "having" or "comprising" does not rule out other elements or steps, and "a" or "an" does not rule out a multiplicity. It is also pointed out that features that have been described with reference to one of the above exemplary embodiments may also be used in combination with other features of other exemplary embodiments described above. Reference signs in the claims are not to be regarded as limiting.

REFERENCE SIGNS

2 System
4 First tank
6 Second tank
8 Cooling unit/Water temperature-controlling unit
10 Heating unit/Water temperature-controlling unit
12 Control unit
14 Filter unit
16 Water feed connection
18 On-board water tank
20 Power supply terminal
21 On-board voltage source
22 Interface
24 Water discharge connection
25 Pump
26 Water-receiving connection 28 Line
30 Trolley
32 Outlet connection
34 Water discharge apparatus
35 Trolley tank
36 Battery
37 Pump
38 Second coil unit
39 First coil unit
40 Germ-reducing unit
42 System
43 Sensor
44 Tank
46 Water temperature-controlling unit
48 Heat exchanger
50 First connection
52 Second connection
54 Cooling unit
56 Heating unit
58 Trolley
60 Aircraft
62 Cabin
64 Galley
66 Parking place

The invention claimed is:

1. An arrangement comprising:
a trolley; and
a system for providing temperature-controlled water in an aircraft, comprising:
   a housing or a frame;
   at least one tank arranged in the housing or the frame;
   at least one water temperature-controlling unit associated with one of the at least one tank;
   a control unit connected to the at least one water temperature controlling unit;
   a power supply terminal;
   an outlet connection for selective removal of water associated with the housing or the frame;
   a water discharge connection arranged at a flexible water line for connection to a connection provided at the trolley; and
   a water-receiving connection configured for receiving water from the trolley provided with a supply by the system and for feeding said water to the outlet connection,
   wherein the at least one water temperature-controlling unit is configured to be coupled to the at least one tank to heat or to cool water situated therein,
   wherein the control unit is connected to the at least one water temperature-controlling unit to activate the at least one water temperature-controlling unit for controlling the temperature of water in the at least one tank to a predefined temperature,
   wherein the power supply terminal is configured to be connected to an on-board voltage source for the at least one water temperature-controlling unit and the control unit to be supplied with electrical voltage,
   wherein the system is in the form of a coherent and self-contained unit configured to be integrated into a standard parking place of a galley of the aircraft such that the housing or the frame is configured to be arranged in a half-size or a full-size trolley parking place in the galley, and
   wherein the at least one tank is mounted so as to be exchangeable or the system has a water discharge connection which is coupled to the at least one tank.

2. The arrangement according to claim 1,
further comprising a water feed connection coupled to the at least one tank to supply the at least one tank with water from an on-board water tank.

3. The arrangement according to claim 2,
wherein a filter unit is arranged between the water feed connection and the at least one tank.

4. The arrangement according to claim 1,
further comprising at least one sensor connected to the control unit and configured for detecting a water temperature in the at least one tank.

5. The arrangement according claim 1,
wherein the at least one water temperature-controlling unit has a heat exchanger through which water from the at least one tank is configured to flow and wherein the heat exchanger is coupled to a heating or cooling device for the water flowing through to be heated or to be cooled.

6. The arrangement according to claim 5,
wherein the heat exchanger has a first connection, connected fluidically to the respective tank, and a second connection, connected fluidically to the respective tank, such that water, after flowing through the heat exchanger, is guided back into the respective tank.

7. The arrangement according to claim 1,
further comprising at least one germ-reducing unit configured to be coupled to the at least one tank and configured for reducing the germ count of water in the at least one tank.

8. The arrangement according to claim 7,
wherein the germ-reducing unit has a UV lamp arranged in the at least one tank.

9. The arrangement according to claim 1,
wherein the system is configured for being arranged in a half-size or full-size trolley parking place of a galley and is configured so as to be complementary thereto.

10. A galley for an aircraft, comprising at least one parking place, and having at least one arrangement according to claim 1 integrated therein.

11. An aircraft comprising at least one galley according to claim 10 arranged therein.

12. The arrangement according to claim 1, wherein the water-receiving connection is configured to feed water to the outlet connection while bypassing the at least one tank.

* * * * *